April 17, 1928.
C. H. KNUDSEN
1,666,292
WORK PIECE SUPPORTING FIXTURE FOR TURNING MACHINES
Original Filed June 19, 1924
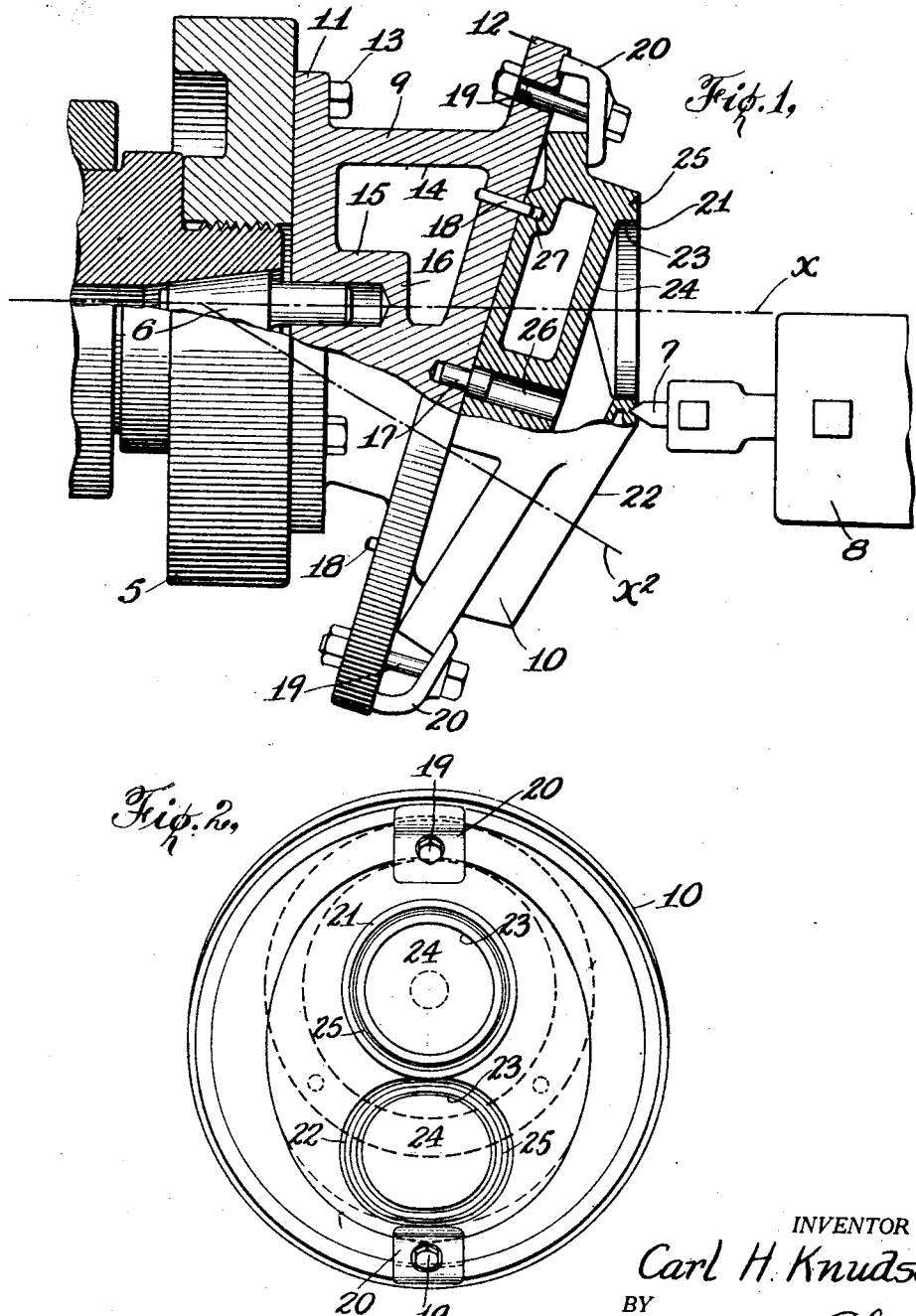
INVENTOR
Carl H. Knudsen
BY
Howard E. Thompson
ATTORNEY Patented Apr. 17, 1928.

1,666,292

UNITED STATES PATENT OFFICE.

CARL H. KNUDSEN, OF BROOKLYN, NEW YORK, ASSIGNOR TO THE KNUDSEN MOTOR CORPORATION, OF WILMINGTON, DELAWARE, A CORPORATION OF DELAWARE.

WORK-PIECE-SUPPORTING FIXTURE FOR TURNING MACHINES.

Application filed June 19, 1924, Serial No. 720,942. Renewed July 1, 1927.

This invention relates to what are commonly known as jigs and fixtures, and particularly to a device of this class for supporting a workpiece having angularly disposed surfaces in connection with the workpiece supporting plate or member of a turning machine in such manner that angularly disposed surfaces may be machined or otherwise fashioned by simply shifting the workpiece into different positions on said device, means being provided to retain the workpiece in proper position; and the object of the invention is to provide a jig or fixture of the class and for the purpose specified which in addition to the features above set out, is provided with means for properly alining and positioning a workpiece thereon in its several positions; a further object being to provide means for properly centering the angularly disposed surfaces with reference to the axis of the rotary plate or member of the machine; and with these and other objects in view, the invention consists in a device of the class and for the purpose specified which is simple in construction, efficient in use, and which is constructed as hereinafter described and claimed, and also consists in the novel method of fashioning workpieces as hereinafter described and claimed.

The invention is fully disclosed in the following specification, of which the accompanying drawing forms a part, in which the separate parts of my improvement are designated by suitable reference characters in each of the views, and in which:—

Fig. 1 is a side and sectional view diagrammatically illustrating the use of my improved jig or fixture, and the method of carrying my invention into effect; and, Fig. 2 is a face view of the construction shown in Fig. 1.

For the purpose of illustrating one use of my invention, I have diagrammatically illustrated in Fig. 1 of the drawing, the main parts of a lathe or turning machine of any kind or class, in connection with which my invention relates, and in said Figure 5 represents the face plate or workpiece supporting plate of a lathe, 6 the centering pin of the face plate, the axis of which is common with the axis of the plate 5, and 7 represents a tool supported in connection with the tool post 8 of the machine.

In carrying my invention into effect, I provide a jig or fixture 9 for supporting a suitable workpiece 10, in connection with the face plate 5, the fixture 9 in the construction shown being provided with two flanged faces 11 and 12, the face 11 being parallel with the face of the plate or member 5 and being adapted to be secured thereto by screws or bolts 13, while the face 12 is arranged at an angle to the face 11 as clearly shown in Fig. 1 of the drawing. The flanged faces 11 and 12 are joined by a body structure 14, and the body 14 or the face 11 is provided with an enlargement 15 having an aperture 16 adapted to receive that part of the centering pin 6 which projects beyond the face plate 5, and the pin 6 fits snugly in the aperture 16 and serves to properly center the fixture 9 upon said face plate, the screws or bolts 13 serving to retain the fixture in proper position.

Mounted substantially centrally of the face 12 of the fixture is a pin 17 which projects beyond said face and which is arranged at right angles thereto, and at equally and oppositely spaced points from the axis of the pin 17 are alining dowel pins 18. Passed through the flange face 12 of the fixture are two or more bolts 19 on which are mounted clamp members 20 which serve to retain the work piece 10 rigidly in connection with the fixture 9.

The workpiece 10 in the construction shown is the cylinder head of an internal combustion engine and is in the form of a cast or otherwise fashioned body having angularly disposed faces and surfaces 21 and 22 of the same construction, and one of which is shown in section in Fig. 1 of the drawing. The angularly disposed faces 21 and 22 permit of the coupling of two independent cylinders with the head in an inverted V-type motor, and my improved fixture is devised for the purpose of facilitating, in a simple and effective manner, the machining of the faces 21 and 22 as well as other surfaces, such for example as the bore 23, the substantially conical end 24 and the backing grooves 25 common to both sides or faces of the cylinder head.

In Fig. 1 of the drawing, I have indicated at $x$ by a dot and dash line, the center of the axis of the plate 5 and it will be noted that when the workpiece or cylinder head 10 is mounted in connection with the fixture 9 as shown in Fig. 1 of the drawing, the line $x$ passes centrally through the bore 23 and at right angles to the face 21. In this position of the workpiece, the face 21 and the surfaces 23, 24, and 25 may be fashioned by the tool 7 in the operation of the machine as will be apparent.

It will be noted that the workpiece 10 is centered on the fixture 9 by the pin 17 entering an aperture 26 centrally of the workpiece, and the dowel pins 18 entering other apertures 27, one of which is shown. The pins 17 and 18 as above set out serve to properly center the workpiece on the fixture and principally to bring the bores 23 in common axial alinement with the plate 5, with the faces 21 and 22 at right angles thereto.

After the face 21 and the surfaces in juxtaposition thereto have been machined or otherwise fashioned, the face 22 may be moved into position to be fashioned by simply releasing the bolts 19 and clamps 20 sufficiently to disengage the work-piece from the pins 18, then revolving the workpiece on the pins 17 to bring the face 22 into the position assumed by the face 21, and the face 21 into the position of the face 22 shown in Fig. 1, and the workpiece resecured in position as will be apparent. In order that the foregoing operation may be clearly understood I have indicated at $x^2$ in Fig. 1 of the drawing, another dot and dash line which is at an angle to the line $x$ and which passes centrally through the bore 23 of the face 22, and with relation to the pin 17; said lines $x$ and $x^2$ are equi-distant from the central axis of the pin 17 and disposed in a straight line which passes through the axis of the pin 17 and the imaginary axis of the line $x$ and $x^2$. In other words, the faces 21 and 22 merely shift positions on the fixture 9.

With my improved fixture, workpieces of the class under consideration and employing angularly disposed surfaces, may be machined or otherwise fashioned in a simple, effective and accurate manner, and while I have shown and described a specific workpiece and specific means for mounting and centering the workpiece in connection with the fixture, it will be understood that I am not necessarily limited in these respects, and other changes in and modifications of the construction herein shown and described, may be made within the scope of the appended claims without departing from the spirit of my invention or sacrificing its advantages.

Having fully described my invention, what I claim as new and desire to secure by Letters-Patent, is:—

1. A fixture of the class described having faces angularly disposed with reference to each other, means on one of said faces for centering the fixture on the rotatable member of a turning machine, means for centering and alining a workpiece on the other face of said fixture whereby angularly disposed faces of said workpiece may be moved and retained in position in a plane at right angles to the axis of the rotatable member of the machine.

2. A fixture of the class described having faces angularly disposed with reference to each other, means on one of said faces for centering the fixture on the rotatable member of a turning machine, means for centering and alining a workpiece on the other face of said fixture whereby angularly disposed faces of said workpiece may be moved and retained in position in a plane at right angles to the axis of the rotatable member of the machine, and clamp devices for detachably mounting the workpiece in connection with the last named face of the fixture.

3. A fixture of the class described having angularly disposed faces, means on one of said faces for centering the fixture on the rotatable member of a turning machine, and means on the other of said faces offset with reference to the axial line of the first centering means for centering a workpiece on said last named face.

4. A fixture of the class described having angularly disposed faces, means on one of said faces for centering the fixture on the rotatable member of a turning machine, means on the other of said faces offset with reference to the axial line of the first centering means for centering a workpiece on said last named face, and means on said last named face for alining a workpiece thereon.

5. A fixture of the class described having angularly disposed faces, means on one of said faces for centering the fixture on the rotatable member of a turning machine, means on the other of said faces offset with reference to the axial line of the first centering means for centering a workpiece on said last named face, means on said last named face for alining a workpiece thereon, and clamp devices for detachably supporting a workpiece in connection with said fixture.

In testimony that I claim the foregoing as my invention I have signed my name this 14th day of June, 1924.

CARL H. KNUDSEN.